Patented Dec. 10, 1929

1,739,031

UNITED STATES PATENT OFFICE

EMMET F. HITCH, HENRY JORDAN, AND AUBREY O. BRADLEY, OF WILMINGTON, DELAWARE, ASSIGNORS TO E. I. DU PONT DE NEMOURS & COMPANY, OF WILMINGTON, DELAWARE, A CORPORATION OF DELAWARE

DISAZO DYES AND PROCESS OF PREPARING THE SAME

No Drawing. Application filed August 7, 1926. Serial No. 127,976.

This invention relates to new disazo dyes suitable for dyeing animal or vegetable fibres, giving shades which have excellent fastness to light and washing. More specifically it relates to disazo dyes which are prepared by diazotizing and coupling an aromatic amino compound not containing an hydroxyl group attached to the nucleus with one molecular proportion of an aromatic middle component containing an amino group but no hydroxyl group attached to the nucleus condensing this amino azo compound with a nitro benzoyl halide, reducing the nitro group, diazotizing, and coupling with a suitable azo dye component.

The new dyes may be represented by the general formula:—

where R and R' represent aromatic radicals not containing a free hydroxyl or amino group attached to the nucleus, which radicals may or may not be sulphonated, and E represents a radical of any azo dye component such as, for example, alpha- and beta-naphthol and their mono- and disulphonic acids, alpha- and beta-naphthylamine and their sulphonic acids, amino-naphthols and their mono- and disulphonic acids, naphthol carboxylic acids, the aryl amides of naphthol carboxylic acids, phenols and amines of the benzene series, pyrazolones and ketoles.

In order to illustrate the new process more fully the following examples are given:—

Example 1

303-lbs. of 2-naphthylamine-6:8-disulphonic acid are diazotized in the customary manner using 69-lbs. of sodium nitrite and the necessary quantity of hydrochloric acid and to this diazo compound is added a solution of 120-lbs. of meta-toluidine and 110-lbs. of hydrochloric acid (Sp. Gr. 1.19). Sodium acetate is then added to neutralize the excess mineral acidity until the solution gives a neutral reaction on Congo red paper. After stirring several hours, or over night, the monoazo dye is salted out and filtered off. It is dissolved in hot water with sufficient sodium hydroxide to give a slightly alkaline solution. 120-lbs. of sodium carbonate are added and, while keeping the temperature of the reaction mixture above 75° C., 250-lbs. of p-nitro-benzoyl chloride are added. The condensation takes place almost immediately and after a few minutes the nitro-benzoyl derivative of the monoazo dye is salted out and filtered off. It is stirred up with hot water and reduced at 80° C. with sodium sulphide. The resulting amino-benzoyl compound is salted out and filtered off. It is dissolved in water at 25° C. and diazotized in the customary manner using approximately 56-lbs. of sodium nitrite and the necessary quantity of hydrochloric acid. The diazo compound is run slowly into a solution containing 290-lbs. of p-amino-benzoyl-2-amino-5-naphthol-7-sulphonic acid together with enough excess sodium carbonate to maintain an alkaline reaction throughout the entire coupling. The resulting dye is salted out, filtered off, and dried.

The new dyestuff thus obtained is the sodium salt of an acid having most probably the following formula:

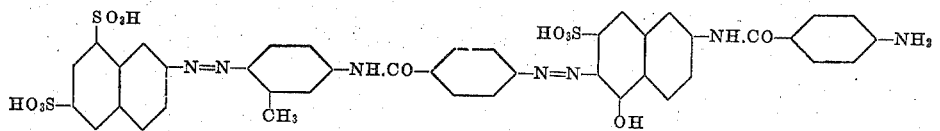

and in the dry and powdered state is a red powder soluble in water with an orange-red color; soluble in concentrated sulphuric acid with a bluish-red color which upon dilution with water gives a reddish-brown precipitate; yielding upon reduction with stannous chloride and hydrochloric acid 2-naphthylamine-6:8-disulphonic acid, 2-p-amino-benzoyl-amino-6-amino-5-naphthol-7-sulphonic acid and 5-p-amino-benzoyl-amino-2-aminotoluene.

The new dyestuff dyes cotton directly an orange shade possessing excellent fastness to light; upon being diazotized on the fiber and developed with beta-naphthol it yields a redder shade of orange of excellent fastness to light and washing and capable of being readily discharged with hydrosulphite; diazotized and developed with phenyl-methyl-pyrazolone it yields a yellower shade possessing similar properties.

When meta-nitro-benzoyl chloride is substituted for the para-nitro-benzoyl chloride in the above example, a dyestuff is obtained which gives a similar shade on cotton but which is somewhat less fast to light.

*Example 2*

The monoazo dye prepared by coupling 223-lbs. of 2-naphthylamine-6-sulphonic acid to 143-lbs. of alpha-naphthylamine is condensed with p-nitro-benzoyl chloride and the condensation product reduced, following the general procedure described in Example 1. The resulting amino-benzoyl compound is diazotized and coupled to 204-lbs. of 1-amino-8-naphthol-4-sulphonic acid in the presence of an excess of sodium carbonate. The resulting dye is salted out, filtered off, and dried.

The new dyestuff thus obtained is the sodium salt of an acid, the latter having most probably the following formula:—

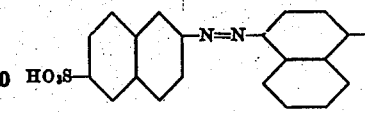

In the dry and powdered state it is a blue-black powder soluble in water with a red color; soluble in concentrated sulphuric acid with a violet color which upon dilution with water gives a reddish-brown precipitate; yielding upon reduction with stannous chloride and hydrochloric acid 2-naphthylamine-6-sulphonic acid, 1-p-amino-benzoyl-amino-4-amino-naphthalene and 1:7-diamino-8-naphthol-4-sulphonic acid.

The new dyestuff dyes cotton directly a bluish-brown shade possessing good fastness to light; upon being diazotized on the fiber and developed with beta-naphthol it yields a full brown shade of good fastness to light and washing and capable of being readily discharged with hydrosulphite; diazotized and developed with phenyl-methyl-pyrazolone it yields a yellower shade of brown possessing similar properties.

It also dyes wool a bluish-brown shade of good fastness to light.

*Example 3*

The monoazo dye prepared by coupling 303-lbs. of 2-naphthylamine-6:8-disulphonic acid to 123-lbs. of ortho-anisidine is condensed with p-nitro-benzoyl chloride and the condensation product reduced, following the general procedure described in Example 1. The resulting amino-benzoyl compound is diazotized and coupled to 190-lbs. of 1-m-amino-phenyl-3-methyl-5-pyrazolone in the presence of an excess of sodium carbonate. The resulting dye is salted out, filtered off, and dried.

The new dyestuff thus obtained is the sodium salt of an acid having most probably the following formula:—

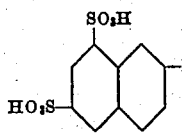 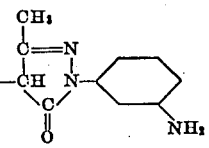

and in the dry and powdered state is a yellow-brown powder soluble in water with a yellow color; soluble in concentrated sulphuric acid with a red color which upon dilution with water gives a yellow precipitate; yielding upon reduction with stannous chloride and hydrochloric acid 2-naphthalamine-6:8-disulphonic acid, 3-methoxy-4-p-amino-benzoyl-amino-aniline and 1-m-amino-phenyl-3-methyl-4-amino-5-pyrazolone.

The new dyestuff dyes cotton directly a yellow shade possessing an excellent fastness to 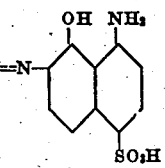 light, upon being diazotized on the fiber and developed with phenyl-methyl-pyrazolone it yields a yellow shade of increased strength, of excellent fastness to light and washing; diazotized and developed with beta-naphthol it yields a yellow shade of orange possessing similar properties.

When the amino-benzoyl derivative of the monoazo dye from 2-naphthylamine-6:8-disulphonic acid and ortho-anisidine is coupled to 1-phenyl-3-methyl-5-pyrazolone instead of the amino-phenyl-methyl-pyrazolone noted above, a new dyestuff is obtained which dyes cotton a bright yellow shade of unusual fastness to light and good fastness to washing, but which cannot be further developed on the fiber. This dyestuff also dyes wool a reddish-yellow shade of excellent fastness to light.

*Example 4*

The monoazo dye prepared by coupling 173-lbs. of aniline-meta-sulphonic acid to 110-lbs. of meta-toluidine is condensed with p-nitro-benzoyl chloride and the condensation product reduced, following the general procedure described in Example 1. The resulting amino-benzoyl compound is diazotized and coupled to 224-lbs. of 1-naphthol-4-sulphonic acid in the presence of an excess of sodium carbonate. The resulting dye is salted out, filtered off, and dried.

The new dyestuff thus obtained is the sodium salt of an acid having most probably the formula:—

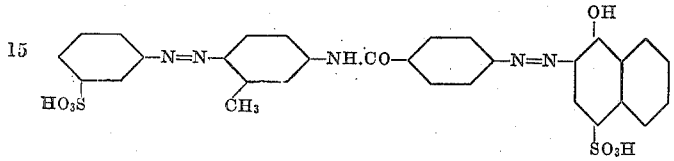

and in the dry and powdered state is a red powder soluble in water with a red color; soluble in concentrated sulphuric acid with a bluish-red color which upon dilution with water gives a red precipitate; yielding upon reduction with stannous chloride and hydrochloric acid aniline-meta-sulphonic acid, 5-p-amino-benzoyl-amino-2-amino-toluene, and 2-amino-1-naphthol-4-sulphonic acid.

The new dyestuff dyes wool and cotton an orange shade possessing excellent fastness to light.

with stannous chloride and hydrochloric acid aniline-disulphonic acid, 5-p-amino-benzoyl-amino-2-amino-toluene and 1-acetyl-amino-7-amino-8-naphthol-3:6-disulphonic acid.

The new dyestuff dyes wool and cotton a bluish-red shade possessing excellent fastness to light.

*Example 6*

The monoazo dye prepared by coupling 173-lbs. of aniline-meta-sulphonic acid to 223-lbs. of 1-naphthylamine-6-sulphonic acid is condensed with p-nitro-benzoyl chloride and the condensation product reduced, following the general procedure described in Example 1. The resulting amino-benzoyl compound is diazotized and coupled to 315-lbs. of 2-phenyl-amino-5-naphthol-7-sulphonic acid in the presence of an excess of sodium carbonate. The resulting dye is isolated and dried.

The new dyestuff thus obtained is the sodium salt of an acid having most probably the formula:

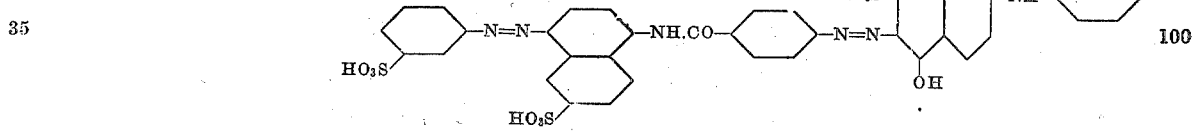

*Example 5*

The monoazo dye prepared by coupling 253-lbs. of aniline-disulphonic acid to 110-lbs. of meta-toluidine is condensed with p-nitro-benzoyl chloride and the condensation product reduced, following the general procedure described in Example 1. The resulting amino-benzoyl compound is diazotized and coupled to 361-lbs. of 1-acetyl-amino-8-naphthol-3:6-disulphonic acid in the presence of an excess of sodium carbonate. The resulting dye is isolated and dried.

The new dyestuff thus obtained is the sodium salt of an acid having most probably the formula:—

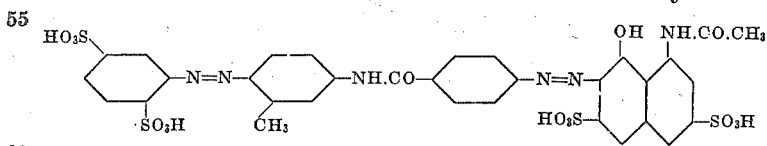

and in the dry and powdered state is a dark red powder soluble in water with a red color; soluble in concentrated sulphuric acid with a violet color which upon dilution with water gives a red solution; yielding upon reduction and in the dry and powdered state is a black powder soluble in water with a purple color, and soluble in concentrated sulphuric acid with a blue color. Upon dilution with water the blue solution gives a violet precipitate; upon reduction with stannous chloride and hydrochloric acid it yields aniline-meta-sulphonic acid, 1-p-amino-benzoyl-amino-4-amino-naphthalene-6-sulphonic acid, and 2-phenyl-amino-6-amino-5-naphthol-7-sulphonic acid.

The new dyestuff dyes cotton directly a violet shade of good fastness to light and readily dischargeable with hydrosulphite.

*Example 7*

303-lbs. of 2-naphthylamine-6:8-disulphonic acid are diazotized and combined with m-toluidine, the azo compound thus formed is condensed with nitro-benzoyl chloride, the nitro group reduced, and the amino-benzoyl compound diazotized following the directions given in Example 1. To this diazo compound there is added a solution of 131-lbs. of methyl ketol in 400-lbs. of a 31% hydrochloric acid solution. Immediately thereafter the coupling mixture is slowly neutralized by gradually adding a solution of sodium carbonate. The temperature of the coupling should be 20° to 25° C. The mixture at the end should give a neutral to weak bicarbonate reaction. The dye is salted out and filtered. It most probably has the following structural formula:—

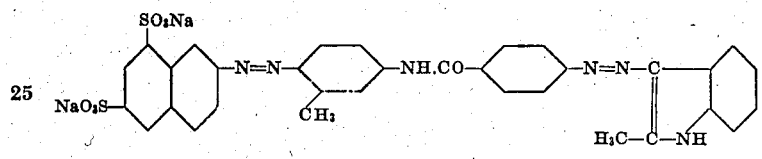

In the dry form it is a light brown powder soluble in water with a yellowish orange color, dyeing cotton in bright yellow shades, which are very fast to light. On mixed fibres of cotton and silk both fibres are dyed practically the same strength and shade from a neutral Glauber's salt bath.

On reduction with stannous chloride the dye will yield the following compounds:—
2-amino-naphthalene-6:8-disulphonic acid;
5-p-amino-benzoyl-amino-2-amino-toluene

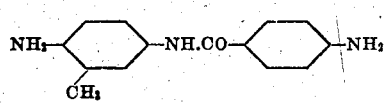

and amino methyl ketol

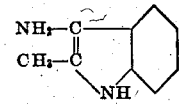

Example 8

Using as an end competent instead of 131-lbs. of methyl ketol as in Example 7, 153-lbs. of nitro-m-phenylenediamine

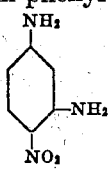

dissolved in 1000-lbs. of water and 120-lbs. of a 31% solution of hydrochloric acid, leaving all other conditions the same as in Example 7, a dye is obtained which in its dry form is an orange powder soluble in water with a yellowish-orange color, dyeing cotton and silk in bright yellowish shades, only slightly redder than the shades produced by the dye formed under Example 7. The properties of this dye are similar to those of the dye formed under Example 7.

The dye has most probably the following structural formula:—

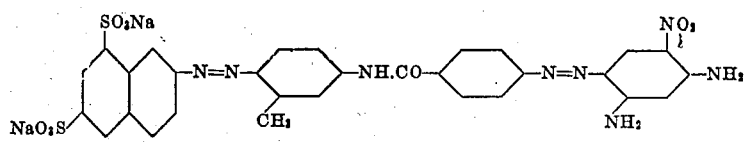

On reduction with stannous chloride the same products will be formed as in Example 7 except instead of amino methyl ketol there is obtained 1:2:4:5-tetra-amino-benzene.

Example 9

Using as an end component instead of 131-lbs. of methyl ketol, as in Example 7, 107-lbs. of m-toluidine dissolved in 1000-lbs. of water and 120-lbs. of a 31% solution of hydrochloric acid, leaving all other conditions the same as in Example 7, a dye is obtained which in its dry form is an orange powder, soluble in water with a bright orange color, dyeing cotton in deep orange shades. The dyeings may be diazotized and developed on the fibre. Development with beta-naphthol gives a deep Bordeaux shade, while phenyl-methyl-pyrazolone gives a bright yellowish-orange, much yellower than the direct dyeing. The developed dyeings are fast to washing and to light.

The dye has most probably the following structural formula:—

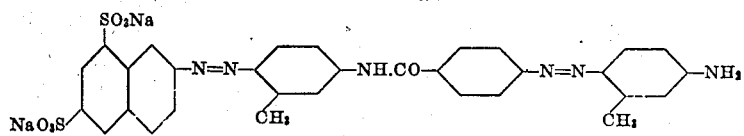

On reduction with stannous chloride the same products are obtained as in Example 7 except that instead of amino-methyl ketol there is formed 2:5-diamino-toluene.

In the foregoing examples other nitro benzoyl halides may be used in place of p-nitro-benzoyl chloride, as for example m-nitro-benzoyl chloride or nitro benzoyl bromide or nitro benzoyl iodide.

In the following tables the shades of some of the new dyes are given.

represents an auxo-chromic radical of any azo dye component.

*Using 2-naphthylamine-6:8-disulphonic acid as first component*

| Second component | Third component | Shade when dyed | | |
|---|---|---|---|---|
| | | On cotton | | On wool |
| | | Developed with direct b-naphthol | | |
| o-anisidine | 1-phenyl-3-methyl-5-pyrazolone | Yellow | ---------- | Yellow |
| o-anisidine | 2-naphthol-6-sulphonic acid | Orange | ---------- | Orange |
| o-anisidine | 1-naphthol-4-sulphonic acid | Orange | ---------- | Red |
| o-anisidine | 1-acetyl-amino-8-naphthol-3:6-disulphonic acid | Red | ---------- | Red |
| o-anisidine | 2-phenyl-amino-8-naphthol-6-sulphonic acid | Brown | ---------- | Brown |
| o-anisidine | 2-amino-8-naphthol-6-sulphonic acid | Brown | Maroon | Brown |
| Cresidine | 1-p-amino-phenyl-3-methyl-5-pyrazolone | Yellow | Orange | Yellow |
| Cresidine | 2-naphthol-3:6-disulphonic acid | Orange | ---------- | Orange |
| Cresidine | 1-naphthol-5-sulphonic acid | Red | ---------- | Red |
| Cresidine | 1-benzoyl-amino-8-naphthol-4:6-disulphonic acid | Red | ---------- | Red |
| Cresidine | 2-p-amino-benzoyl-p-amino-benzoyl-amino-5-naphthol-7-sulphonic acid | Scarlet | Scarlet | ---------- |
| Cresidine | 1-amino-8-naphthol-4-sulphonic acid | Brown | Brown | Brown |

*Using 2-naphthylamine-4:8-disulphonic acid as first component*

| m-toluidine | 1-p-sulpho-phenyl-3-methyl-5-pyrazolone | Yellow | ---------- | Yellow |
|---|---|---|---|---|
| m-toluidine | Meta-dihydroxy-benzene | Orange | ---------- | Orange |
| m-toluidine | Beta-naphthol | Orange | ---------- | Orange |
| m-toluidine | 2-p-amino-benzoyl-amino-5-naphthol-7-sulphonic acid | Scarlet | Scarlet | ---------- |

*Using metanilic acid as first component*

| Cleves acid | 2-naphthol-6-sulphonic acid | Brown | ---------- | Brown |
|---|---|---|---|---|
| Cleves acid | 2-phenyl-amino-8-naphthol-6-sulphonic acid | Brown | ---------- | Brown |
| Cleves acid | 2-p-amino-benzoyl-amino-8-naphthol-6-sulphonic acid | Brown | Brown | Brown |
| Cleves acid | 1-benzoyl-amino-8-naphthol-4:6-disulphonic acid | Blue | ---------- | Blue |
| Cleves acid | 1-amino-8-naphthol-3:6-disulphonic acid | Green | Green | Blue |

*Using aniline-2:5-disulphonic acid as first component*

| m-toluidine | Aceto-acetanilide | Yellow | ---------- | ---------- |
|---|---|---|---|---|
| m-toluidine | b-hydroxy-naphthoic acid | Orange | ---------- | Orange |
| m-toluidine | 1-naphthylamine-6-sulphonic acid | Red-brown | Brown | Brown |

*Using 2-naphthylamine-6-sulphonic acid as first component*

| Alpha-naphthylamine | 1-m-amino-phenyl-3-methyl-5-pyrazolone | Yellow | Orange | Yellow |
|---|---|---|---|---|
| Alpha-naphthylamine | 1-naphthol-4-sulphonic acid | Orange | ---------- | Orange |
| Alpha-naphthylamine | 2-p-amino-benzoyl-amino-5-naphthol-7-sulphonic acid | Scarlet | Scarlet | ---------- |

*Using m-xylidine-o-sulphonic acid as first component*

| m-toluidine | 1-phenyl-3-methyl-5-pyrazolone | Yellow | ---------- | Yellow |
|---|---|---|---|---|
| m-toluidine | 2-naphthol-6:8-disulphonic acid | Orange | ---------- | Orange |
| m-toluidine | 1-acetyl-amino-8-naphthol-3:6-disulphonic acid | Red | ---------- | Red |
| m-toluidine | 2-phenyl-amino-8-naphthol-6-sulphonic acid | Brown | ---------- | Brown |

By suitably varying the various compounds within the limits recited in the appended claims, a large number of valuable disazo dyes, suitable for dyeing animal or vegetable fibres and of excellent fastness to light and washing, may be prepared. Suitable departures from the exemplified operating conditions may be made without materially affecting the dyes obtained.

We claim:

1. A dye of the general formula:—

wherein R and $R_1$ represent aromatic radicals containing neither a hydroxyl nor an amino group attached to the nucleus and E represents an auxo-chromic radical of any azo dye component.

2. A dye compound comprising the azo group:

wherein R represents a sulfonated aromatic radical in which the nucleus contains neither a hydroxyl nor an amino group, $R_1$ represents an aromatic radical in which the nucleus is amino- and hydroxy-free and E represents an auxo-chromic radical of any azo dye component.

3. A dye compound comprising the azo group:

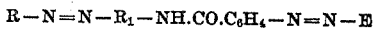

wherein R and $R_1$ both represent a sulfonated aromatic radical in which the nucleus contains neither a hydroxyl nor an amino group and E represents an auxo-chromic radical of any azo dye component.

4. A dye compound comprising the azo group:

wherein R represents an aromatic radical in which the nucleus contains neither a hydroxyl nor an amino group, $R_1$ represents a sulfonated aromatic radical in which the nucleus contains neither a hydroxyl nor an amino group and E represents an auxo-chromic radical of any azo dye component.

5. A dye of the general formula:

$$R-N=N-R_1-NH.CO.C_6H_4-N=N-E$$

wherein R and $R_1$ represent aromatic radicals containing neither a hydroxyl nor an amino group attached to the nucleus and E represents an auxo-chromic amino naphthyl group.

6. A dye of the general formula:

$$R-N=N-R_1-NH.CO.C_6H_4-N=N-E$$

wherein R and $R_1$ represent aromatic radicals containing neither a hydroxyl nor an amino group attached to the nucleus and E represents an auxo-chromic group of the class consisting of substituted phenyl, substituted naphthyl, pyrazolone and ketol groups adapted to form a disazo dye.

7. A dye of the general formula:

$$R-N=N-R_1-NH.CO.C_6H_4-N=N-E$$

wherein R and $R_1$ represent aromatic radicals containing neither a hydroxyl nor an amino group attached to the nucleus and E represents an auxo-chromic sulfonated amino naphthyl group.

8. A dye of the general formula:

$$R-N=N-R_1-NH.CO.C_6H_4-N=N-E$$

wherein R and $R_1$ represent aromatic radicals containing neither a hydroxyl nor an amino group attached to the nucleus and E represents an auxo-chromic sulfonated, substituted amino hydroxy-naphthyl group.

9. The process of preparing a disazo dye which comprises diazotizing an hydroxy-free-aryl-amino compound, coupling the resulting diazo compound to an hydroxy-free-aryl-amino compound, condensing the resulting amino-azo compound with a nitro-benzoyl-halide, reducing the resulting nitro-benzoyl-amino compound, diazotizing and then coupling the resulting diazo-azo compound with an azo dye component.

10. The process of preparing a disazo dye which comprises diazotizing an hydroxy-free-aryl-amino compound, coupling the resulting diazo compound to an hydroxy-free-aryl-amino compound, condensing the resulting amino-azo compound with a p-nitro-benzoyl chloride, reducing the resulting nitro-benzoyl-amino compound, diazotizing and then coupling the resulting diazo-azo compound with an azo dye component.

11. The process of preparing a disazo dye which comprises diazotizing a sulfonated hydroxy-free-aryl-amino compound, coupling the resulting diazo compound to an hydroxy-free-aryl-amino compound, condensing the resulting amino-azo compound with a nitro-benzoyl-chloride, reducing the resulting nitro-benzoyl-amino compound, diazotizing and then coupling the resulting diazo-azo compound with an azo dye component.

12. The process of preparing a disazo dye which comprises diazotizing an hydroxy-free-aryl-amino compound, coupling the resulting diazo compound to a sulfonated hydroxy-free-aryl-amino compound, condensing the resulting amino-azo compound with a nitro-benzoyl-chloride, reducing the resulting nitro-benzoyl-amino compound, diazotizing and then coupling the resulting diazo-azo compound with an azo dye component.

13. The process of preparing a disazo dye which comprises diazotizing a sulfonated hydroxy-free-aryl-amino compound, coupling the resulting diazo compound to a sulfonated hydroxy-free-aryl-amino compound, condensing the resulting amino-azo compound with a nitro-benzoyl-chloride, reducing the resulting nitro-benzoyl-amino compound, diazotizing and then coupling the resulting diazo-azo compound with an azo dye component.

14. The process of preparing a dye which comprises diazotizing a hydroxy-free-aryl-amino compound, coupling the resulting diazo compound to a hydroxy-free-aryl-amino compound, condensing the resulting amino-azo compound with a nitro-benzoyl-chloride, reducing the resulting nitro-benzoyl-amino compound, diazotizing and then coupling the resulting diazo-azo compound with an aryl azo dye component.

15. The process of preparing a dye which comprises diazotizing a hydroxy-free-aryl-amino compound, coupling the resulting diazo compound to a hydroxy-free-aryl-amino compound, condensing the resulting amino-azo compound with a nitro-benzoyl-chloride, reducing the resulting nitro-benzoyl-amino compound, diazotizing and then coupling the resulting diazo-azo compound with a naphthalene azo dye component.

16. The process of preparing a dye which comprises diazotizing a hydroxy-free-aryl-amino compound, coupling the resulting diazo compound to a hydroxy-free-aryl-amino compound, condensing the resulting amino-azo compound with a nitro-benzoyl-chloride, reducing the resulting nitro-benzoyl-amino compound, diazotizing and then coupling the resulting diazo-azo compound with an amino naphthalene azo dye component.

17. The process of preparing a dye which comprises diazotizing a hydroxy-free-aryl-amino compound, coupling the resulting diazo compound to a hydroxy-free-aryl-amino compound, condensing the resulting amino-azo-compound with a nitro-benzoyl-chloride, reducing the resulting nitro-benzoyl-amino compound, diazotizing and then coupling the resulting diazo-azo compound with a sulfonated amino naphthalene azo dye component.

18. Textile material dyed with compounds of the type set forth in claim 1.

In testimony whereof we affix our signatures.

EMMET F. HITCH.
HENRY JORDAN.
AUBREY O. BRADLEY.